United States Patent
Chaudri et al.

(10) Patent No.: US 6,275,861 B1
(45) Date of Patent: *Aug. 14, 2001

(54) METHOD AND APPARATUS TO IDENTIFY FLOWS IN DATA SYSTEMS

(75) Inventors: Imran Chaudri, North Potomac; Srini Wishnu Seetharam, Gaithersburg, both of MD (US)

(73) Assignee: PMC-Sierra, Inc., Burnaby (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/937,285

(22) Filed: Sep. 15, 1997

Related U.S. Application Data

(60) Provisional application No. 60/027,278, filed on Sep. 27, 1996.

(51) Int. Cl.[7] .............................. G06F 13/00; G06F 15/00
(52) U.S. Cl. ......................... 709/238; 709/234; 709/233; 707/3
(58) Field of Search .................................... 709/234, 235, 709/236, 238, 245, 226, 221, 227, 232; 712/29

(56) References Cited

U.S. PATENT DOCUMENTS

| | | | |
|---|---|---|---|
| 5,422,879 | * | 6/1995 | Parsons et al. ....................... 709/232 |
| 5,463,777 | * | 10/1995 | Bialkowski et al. ................. 709/238 |
| 5,521,910 | * | 5/1996 | Matthews . |
| 5,790,546 | * | 8/1998 | Dobbins et al. . |
| 5,812,781 | * | 9/1998 | Fahlman et al. ..................... 709/226 |
| 5,838,975 | * | 11/1998 | Abramson et al. . |
| 5,862,344 | * | 1/1999 | Hart ..................................... 709/238 |
| 5,881,241 | * | 3/1999 | Corbin ................................. 709/238 |
| 5,978,844 | * | 11/1999 | Tsuchiya et al. .................... 709/221 |
| 6,016,401 | * | 1/2000 | Rostoker et al. ....................... 712/29 |
| 6,047,323 | * | 4/2000 | Krause ................................. 709/227 |

OTHER PUBLICATIONS

Jabbari, B., "A bandwidth allocation technique for high speed network", Dec. 2–5, 1990, Global Telecommunications Conference, 1990, and Exhibition. 'Communications: Connecting the Future', GLOBECOM '90., vol. 1, pp. 355–359.*

Stallings, William, "Lightweight protocols", Aug. 1993, LAN Magazine, Miller Freeman Inc., vol. 8 No. 8, p 69 (7).*

Shimamoto et al., "A dynamic routing control based on a genetic algorithm", Mar. 28–Apr. 1, 1993, Neutral Networks, 1993., IEEE International Conference, vol. 2, pp. 1123–1128.*

Waldman, Jonathan, "Track down files with File Hunter", Jul. 1995, PC Magazine, Ziff–Davis Publishing Company, vol. 14 No. 13., p323 (6).*

* cited by examiner

Primary Examiner—Zarni Maung
Assistant Examiner—Almari Romero
(74) Attorney, Agent, or Firm—Townsend and Townsend and Crew LLP; Kenneth R. Allen

(57) ABSTRACT

Flows in data streams are identified according to a simple but flexible device whereby searching for a flow identification is done according to a standard routine that can be accomplished with customized circuitry. Flexibility is achieved by allowing parameters of the search routine to be specified in memory which can be programmably altered. Speed and flexibility are thereby both achieved.

5 Claims, 6 Drawing Sheets

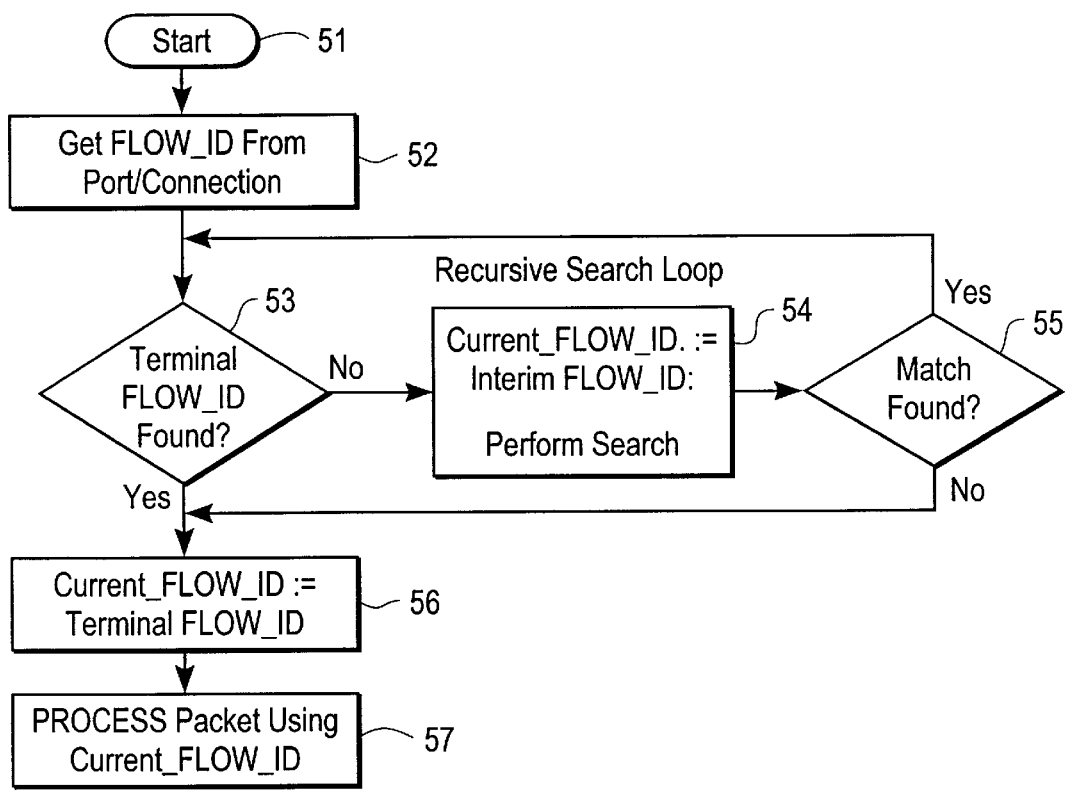

FIG. 3

| Field | Description |
|---|---|
| Pointer<br>2 Octets | The MSB indicates if this entry is:<br>(1) Valid<br>or<br>(0) Invalid<br>Bits (14:0) constitute a pointer to the next (Search) Data Structure. |
| FLOW_ID<br>2 Octets | The MSB indicates if:<br>(0) Interim FLOW_ID (further searches need to be performed),<br>or<br>(1) Terminal FLOW_ID (no further searches are required).<br>Bits (14:0) indicates the FLOW_ID. |
| Offset<br>1 Octet | An offset in number of octets from the start of the packet. The search Mask is applied to the packet from this point onwards. |
| Search Mask<br>5 Octets | This is a vector with up to 20 bits set to '1'. These correspond to octets that are extruded from the 40 octets of the packet, starting from the offset, in order to generate up to 20 octets of the Search Key. |
| Search Key<br>22 Octets | The Search Key is formed by concatenating the FLOW_ID with the Octets extracted from the packet using the Search Mask. |

FIG. 5

METHOD AND APPARATUS TO IDENTIFY FLOWS IN DATA SYSTEMS

This application claims priority from provisional patent application 60/027,278 filed Sep. 27, 1996, incorporated herein by reference.

This application has been filed with a microfiche appendix of 169 frames on 2 sheets comprising a preliminary user manual for apparatus related to the invention. A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates to electronic circuits and to digital communication. More particularly, the present invention relates to an advanced method for handling data units (packets) within a communication device by efficiently determining a flow identification for a data unit using a simplified and protocol independent method.

The present invention has a number of applications in advanced telecommunication systems and networks. One envisioned application of the invention is in a state-of-the-art router (or layer three switch) for handling data packets. These data packets may be constructed according to a number of well-know packet transmission protocols in a layered protocol suite. Routers are packet switching devices characterized by their ability to perform intelligent routing of packets on a per-packet basis. Routers generally can handle packets or frames of data formatted according to a number of different protocols. A layer three switch is a type of router that performs layer three routing of packets largely or exclusively using dedicated logic circuitry.

Other applications of the invention include fast recursive look-up for grouping any kind of discreet data unit quickly into groups for group-based handling.

Explanation of both the prior art and the invention will be better understood with reference to specific examples, however this should not be taken to limit the invention to the particular examples described. The invention is generalizable to other similar types of communication devices or to other computing devices handling data is ways that are analogous to data handling in modern networks. The invention should therefore not be limited except as provided in the attached claims.

Networking Devices Standards

This specification presumes familiarity with the general concepts, protocols, and devices currently used in LAN networking and WAN inter networking applications such as, for example, the IEEE 802 and ISO 8802 protocol suites and other series of documents released by the Internet Engineering Task Force that are publicly available. LANs are arrangements of various hardware and software elements that operate together to allow a number of digital devices to exchange data within the LAN and also may include internet connections to external wide area networks (WANs).

Packets

In the most common LANs and WANs in use today, data is transmitted among network devices and processed within devices as series of independent packets, each packet containing at least one header having at least a destination address specifying an ultimate destination and generally also having a source address. Headers may also include other handling information such as an indication of the different protocols used to format a packet, a transmission priority, etc.

FIG. 1 depicts an example of a packet as it may be transmitted on a network. The example shown is essentially an Ethernet packet, having an Ethernet header 202 and a 48-bit Ethernet address (such as 00:85:8C:13:AA) 204, and an Ethernet trailer 230. Within the Ethernet packet 200 is contained, or encapsulated, an IP packet, represented by IP header 212, containing a 32 bit IP address 214 (such as 199.22.120.33). Packet 200 contains a data payload 220 which holds the data the user is interested in receiving or holds a control message used for configuring the network. Many other types and configurations of packets are presently known in the networking art and it is assumed that additional packet protocols will be developed in the future.

Layers

An additional background concept important to understanding network communications is the concept of layered network protocols. Modern communication standards, such as the TCP/IP Suite and the IEEE 802 standards, organize the tasks necessary for data communication into layers. At different layers, data is viewed and organized differently, different protocols are followed, and different physical devices may handle the data traffic. FIG. 2 illustrates one example of a layered network standard having a number of layers, the Physical Layer, the Data Link Layer, the Routing Layer, the Transport Layer and the Application Layer. These layers correspond roughly to the layers as defined within the TCP/IP Suite. (The 802 standard has a different organizational structure for the layers and uses somewhat different names and numbering conventions.)

An important ideal in layered standards is the ideal of layer independence. A layered protocol suite specifies standard interfaces between layers such that, in theory, a device and protocol operating at one layer can coexist with any number of different protocols operating at higher or lower layers, so long as the standard interfaces between layers are followed.

Optimizing The Handling of Data Units (Packets) within a Network Device

With an increasing number of network users needing increasing amounts of network bandwidth, there is a need for network devices to become efficient and sophisticated in their internal processing and routing of data. One mechanism known in the art for processing packets more efficiently is for network devices to identify flows in packets. A flow may be defined generally as a group of related packets that share some common characteristic which the network device may use to optimize the handling of the packets. For example, a network device may establish separate buffers for different flows so that very heavy traffic on one flow will not be allowed to cause congestion on another flow, or a network device may otherwise optimize its operation by grouping packets in flows.

In prior art systems, first the packets themselves are identified. The identification of packets is done based on the packet header. Each protocol has a header that uniquely identifies it. As described above, communication protocols frequently have encapsulated packets. That is, one protocol carried within another protocol. These are called protocol layers. In prior art systems, in order to group related packets together into flows, it is necessary to determine and identify multiple layers of protocols. The flow can be coarsely defined at a higher layer, requiring the identification of the outer protocol(s). A flow can also be defined at a finer layer of granularity by identifying multiple layers of encapsulated protocols.

Once a flow is identified, packets belonging to that flow can be isolated from other packets. The isolation of a flow permits the network device to process the flow independently from other packets. It also shields the flow from harmful effects caused by other flows.

Within the art it is becoming common to construct networking devices that perform layer three routing tasks using dedicated logic circuits. These devices are sometimes referred to as layer three switches. One task that these devices attempt to perform using fast dedicated logic is identifying and assigning packets to flows. In one such known system, for example, flows are identified by the system looking for packets flowing from a particular source address to a particular destination address. If a specified number of packets are received in a specified period of time having the same source and destination address, the system will establish a flow for those packets and may attach a flow identification field to those packets, allowing special handling of those packets within that device or by other networking devices in the network.

There is a trade-off, however, to be had between very fast layer three routing (or other processing of data units) done by dedicated hardware, and the flexibility that may be required in different networking operations. This flexibility is often achieved by using modifiable software to control data handling. Modern networks are often called on to carry a wide variety of network traffic under a wider variety of protocols, all over the same network hardware. Therefore, a networking device hard-wired to determine a flow based on a source and destination address at a IP or IPX layer may not be able to establish a different flow should it be desired based on an Ethernet address of a packet. The device also may not be able to be reconfigured to handle the inevitable changes to network protocols or new protocols that are developed.

What is needed is a mechanism that would allow a high performance communication device to perform routing or sorting functions very quickly in hardware while allowing the operation of the routing function and flow assignment be specified and configured programmably so that it can be easily changed and can flexibly respond to different requirements of different network protocol layers.

SUMMARY OF THE INVENTION

In general terms, the present invention comprises techniques and devices for an improved handling of unitized or packetized data. More specific applications of the invention include handling of packet data in a network router or layer three switch to perform network routing functions.

The present invention identifies flows in data units by a recursive process of associating a flow identification with a data unit, embedding or associating rules with the flow id for extracting data from the data unit, and using the extracted data to perform a search in a memory for a next level recursion flow identification. During the recursions, a flow identification may be tested to determine if it is a final or specific flow identification and based on the test, the data unit may be identified as belonging to a particular flow. A current or default flow identification may also be assigned if a memory search for a new flow identification fails to find a flow identification in the memory.

In a specific embodiment, the search routine used to recursively search on data to identify flows is done by dedicated hardware logic, thereby allowing fast searching. However, the search is performed using parameters stored in modifiable memory locations or registers. Thus, fast but flexible searching on packets may be performed.

The invention also comprises a network operating with devices having flow identification as described herein. In such a network, packet traffic between routing devices may be configured so that once one device has identified a flow, that flow identifier may be attached to the packet so that other network devices do not need to perform a search to determine the flow for that packet.

Additional aspects of the invention will be better understood upon reference to the following description of specific embodiments and the attached claims.

BRIEF DESCRIPTION OF THE DRAWINGS

FIG. 3 is a flow chart illustrating a method of the invention.

FIG. 5 illustrates an example data structure within a search memory according to the invention.

DETAILED DESCRIPTION OF SPECIFIC EMBODIMENTS

The following glossary provides illustrative explanation of some terms used herein, in some cases within the context of specific examples.

Port or Connection: A physical or virtual ingress or egress associated with a device having multiple ports or connections.

Flow: A group of related packets or other data units. The relationship can be based on a common source, common destination, common path traversed, common application, any arbitrary condition, or any combination of the above.

FLOW_ID: A flow identifier is an index to the set of processing instructions indicating how to handle data packets classified into a flow.

Terminal FLOW_ID: Once a Terminal FLOW_ID has been found, no more searches are required and the Terminal FLOW_ID is used. Also may be referred to as a Specific FLOW_ID.

Interim FLOW_ID: This is a flow identifier at a level of coarse granularity. Multiple flows may be grouped into a flow identified by an Interim FLOW_ID. In addition, finer levels of granularity may exist and can be found by performing further searches using the Interim FLOW_ID and parameters (Offset and Search Mask) supplied with it.

Search Mask: Generally, a value stored along with a FLOW_ID that determines which parts of a packet will be used to determine a next FLOW_ID. In one embodiment, a bit vector of known length with certain bits set to '1'. In a specific embodiment of the invention, these '1' bits represent the octets that must be extracted from the packet (starting from the Offset) to form the Search Key.

Offset: The number of octets or fields from the start of the packet that must be skipped before the search mask is applied.

Search Key: The Search Key is formed by concatenating the Interim FLOW_ID with the octets extracted from the packet (after applying the Offset and Search Mask).

Search Operation

Figures 1, 2:
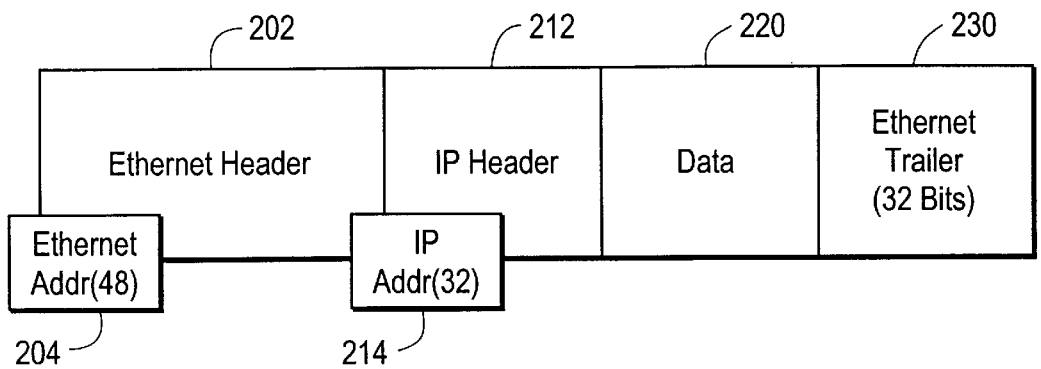
FIG. 1 is a diagram of a packet as an example of a type of data unit upon which the invention may be effectively employed.
FIG. 2 is a diagram illustrating a layered network protocol.
Figure 4:
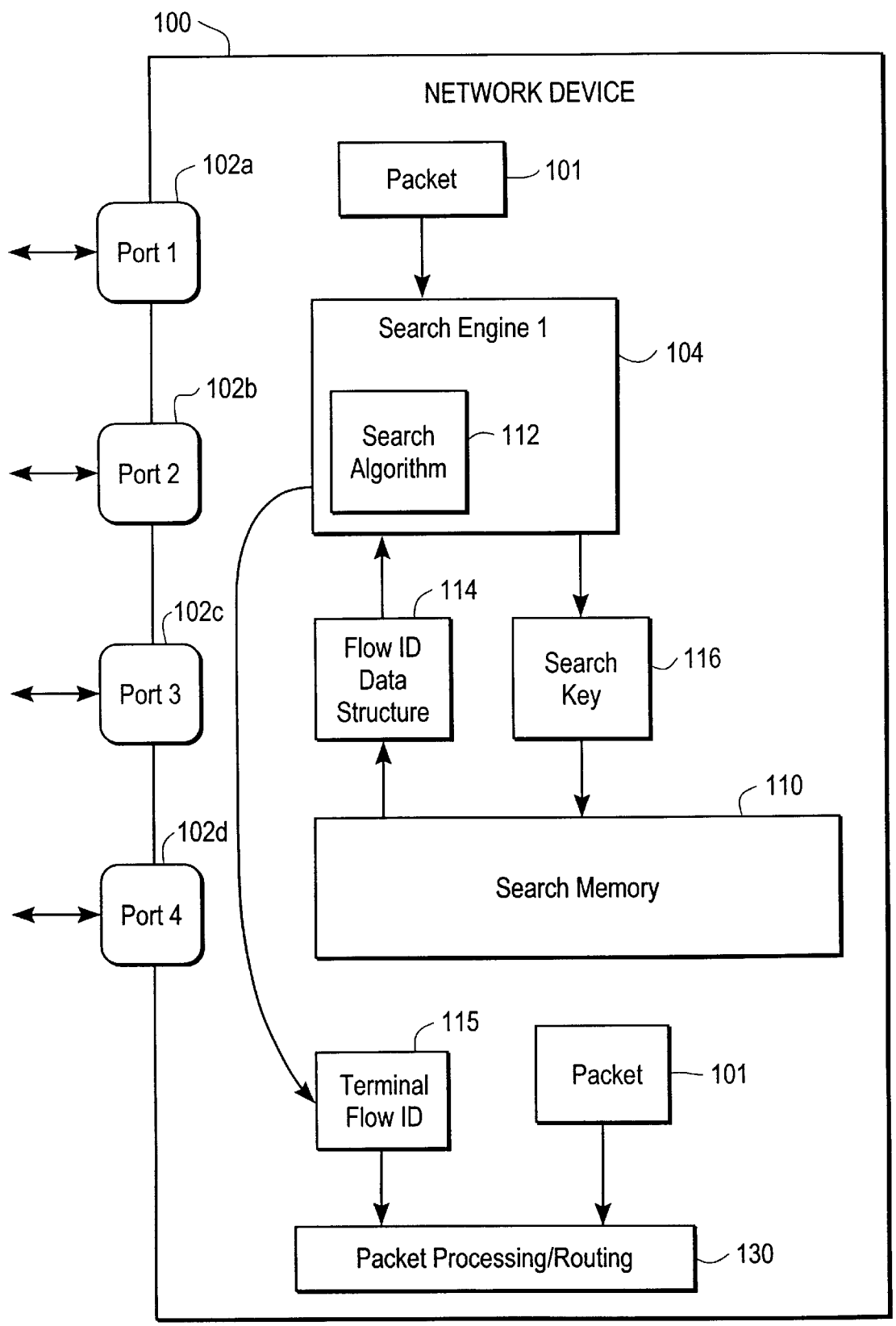
FIG. 4 is a block diagram of a network device incorporating aspects of the invention.

FIG. 3 is a flow chart showing a search operation according to one embodiment of the present invention and FIG. 4 is a block diagram of a network device (or element) 100 according to a specific embodiment of the invention.

When a packet 101 comes in on a port (Step S1), a search engine 104 needs to perform a search operation on the packet to identify the flow. The port/connection number is used to lookup a FLOW_ID (S2). Searches are performed until either a Terminal FLOW_ID 115 is found (S3) or a search fails (S5). If the search fails, then the most recent interim FLOW_ID is used (S6). With each new interim FLOW_ID, a new Offset and Search Mask are also provided, as shown in FIG. 3. This Search Mask is a bit vector that is a known length and has certain bits that are set to '1'. In one embodiment, each bit with the value '1' represents an octet that must be extracted from the of the packet starting at the octet indicated by the offset, though other encoding schemes will be apparent to those of skill in the art.

The Interim FLOW_ID along with the set of octets extracted from the packet form a new Search Key that ranges in length depending on the length of the FLOW_ID and the number of octets extracted from the packet. Search memory 110 is searched using a specific search algorithm 112 (Any user defined search method may be used such as a hash table, binary tree, linear search, etc.). If the search passes, then the result of the search is either an interim FLOW_ID along with another Offset and Search Mask or simply the Terminal FLOW_ID. Thus the search continues recursively until the search fails or a Terminal FLOW_ID is found.

While any type of search algorithm may be used, one search algorithm contemplated for the invention is an hash index of linked-lists, as is known in the art. In this method, a current FLOW_ID is combined (either by a simple concatenation or by any other logic function) with octets extracted from a packet according to a search mask. This string of octets is then processed by a hash or indexing function to generate an index. The index is used to look-up a data structure for a next FLOW_ID. That data structure includes a full copy of the search key and a pointer to a next data structure in the linked-list for that particular index value. If the search key stored with the data structure matches the original search key, then the data structure is retrieved and processing continues. If the data structure search key does not match the original search key, then the next data structure in the linked-list is retrieved and search keys are again compared. This continues until a matching search key is found in that linked-list or the search fails.

If the Terminal FLOW_ID is found, then the packet processing can commence through processor 130 according to the flow determined for the packet. If the search fails, then the most recent Interim FLOW_ID is used to process the packet. Thus the most recent Interim FLOW_ID provides a default entry for all flows at a particular layer.

As shown in FIG. 3, the operation is a recursive searching for a terminal FLOW_ID. When a FLOW_ID is found that is flagged as a terminal FLOW_ID or when a search fails, the recursion ends and the packet is routed or processed according to the last FLOW_ID identified for the packet.

Other Characteristics

Figure 7:
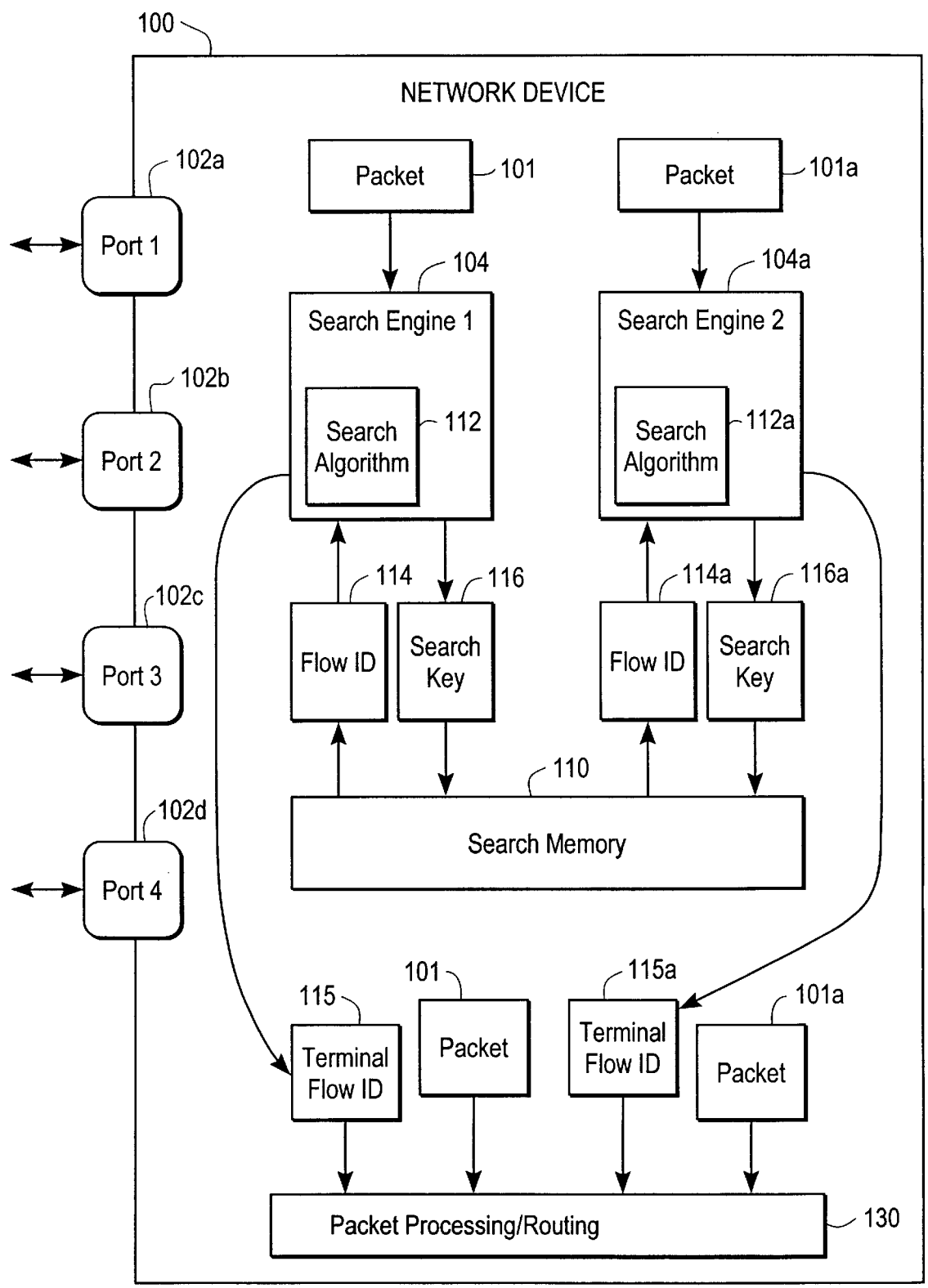
FIG. 7 is a block diagram of an alternative network device incorporating aspects of the invention

The invention, in various embodiments, provides a number of benefits in high performance network devices or in computer systems handling similar data. According to the recursive search procedure of the invention, multiple layers of encapsulated packets can be searched to identify flows. The invention also allows for distributed and parallel searches of multiple packets to identify flows with multiple search engines, an example of which is shown in FIG. 7. In the recursive search, each successive search can isolate a flow at a finer granularity. This allows for individual processing on very specific flows that require them to be isolated. At each level of search, the Interim FLOW_ID provides a default mechanism of handling the flows that cannot (or need not) be identified with finer granularity. Thus reducing the number of total search table entries that need to be maintained.

It will also be apparent from the invention within the context of the prior art, that one implementation of the invention will allow for designing of dedicated fast logic circuitry to perform the construction of search keys from FLOW_IDs and packet data and to perform the search function while allowing the actual definition of flows to be programmably configurable through setting data in the search memory and in the FLOW_ID data structure.

According to an embodiment of the invention, a data structure is defined for storing the FLOW_ID and associated data which are used to perform the search and derive a search key for a second flow id. One specific example of such a data structure is shown in FIG. 5. In this example, specific lengths of bit vectors are provided for illustrative purposes only. As shown in the figure, the example data structure includes a valid bit, a pointer to a next data structure in a chain of data structures matching an index chain, an offset to indicate where a Search Mask should be applied to the packet, a Search Mask bit vector in order to generate a next Search Key, and a Search Key for that data structure to be compared to the search key formed by concatenating the FLOW_ID with the Octets extracted from the packet using the Search Mask. The search key is used to determine if the correct data structure has been located by the index.

Figure 6:
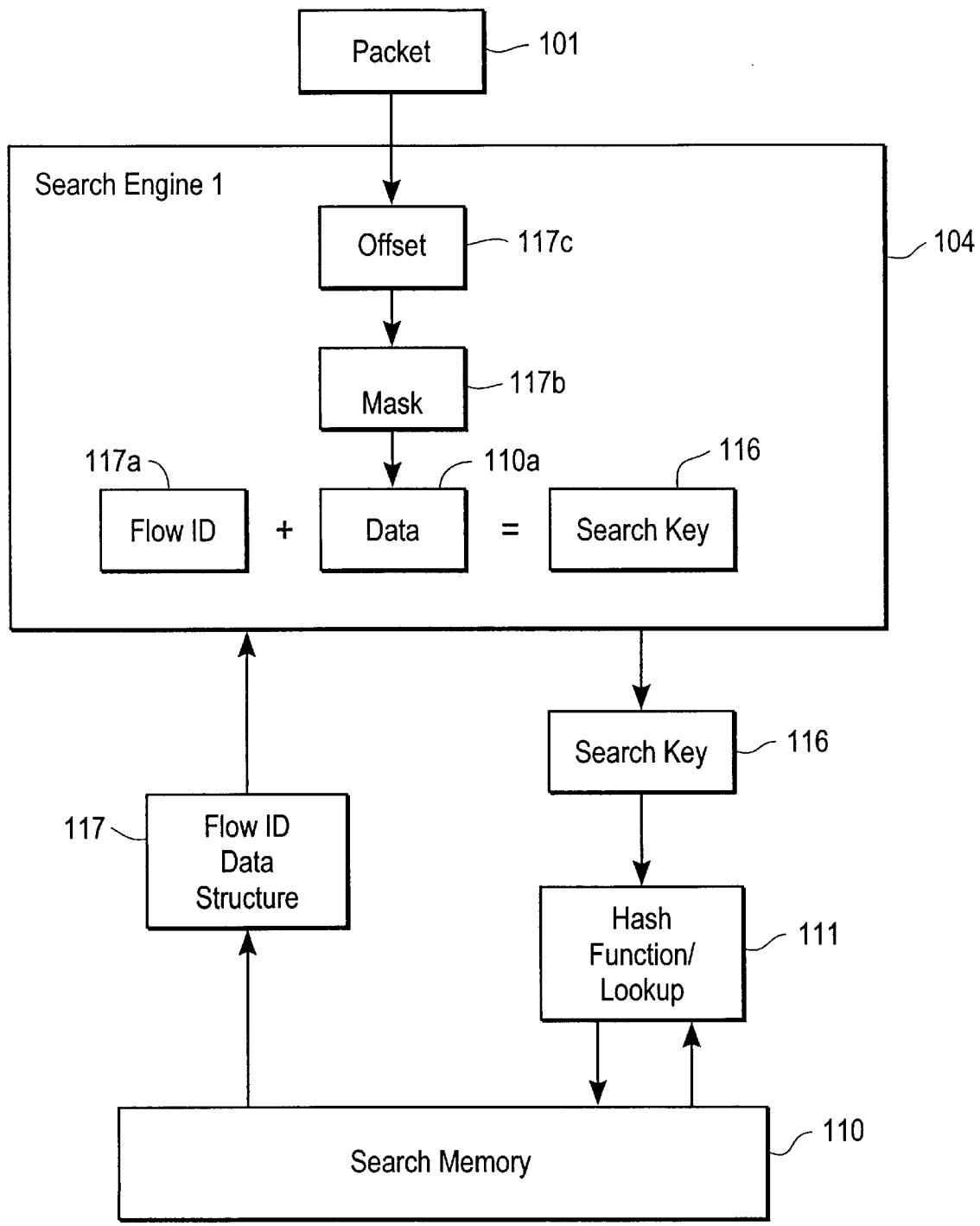
FIG. 6 is a block diagram of a search engine and memory according to one embodiment of the invention.

FIG. 6 shows a more detailed block diagram of search engine 104 and search memory 110 according to various specific embodiments of the invention. In this embodiment is depicted search engine 110 including registers or similar memory locations for flow identification 117a, mask 117b, offset 117c, extracted packet data 110a, and search key 116. According to one embodiment of the invention, these registers are the alterable parameters of search engine 104 which will otherwise perform its search function using fast dedicated custom logic circuits. These alterable registers may be set up to default values by a management program. According to the invention, search engine 104 is able to very quickly derive a search key from a data packet according to the values specified in the registers 117b and 117c. This search key is then used to look up a data structure for a next flow identification and this data structure is used to derive new values for flow id 117a, mask 117b, and offset 117c. According to one embodiment, this data structure lookup may be accomplished using a hash function and indexed table of linked-list as is known in the art, which would be performed by hash lookup 111. Hash lookup 111 may be a function performed by customized logic circuits as part of search engine 104 or may be performed in a separate circuit associated with search memory 110.

Figure 8:
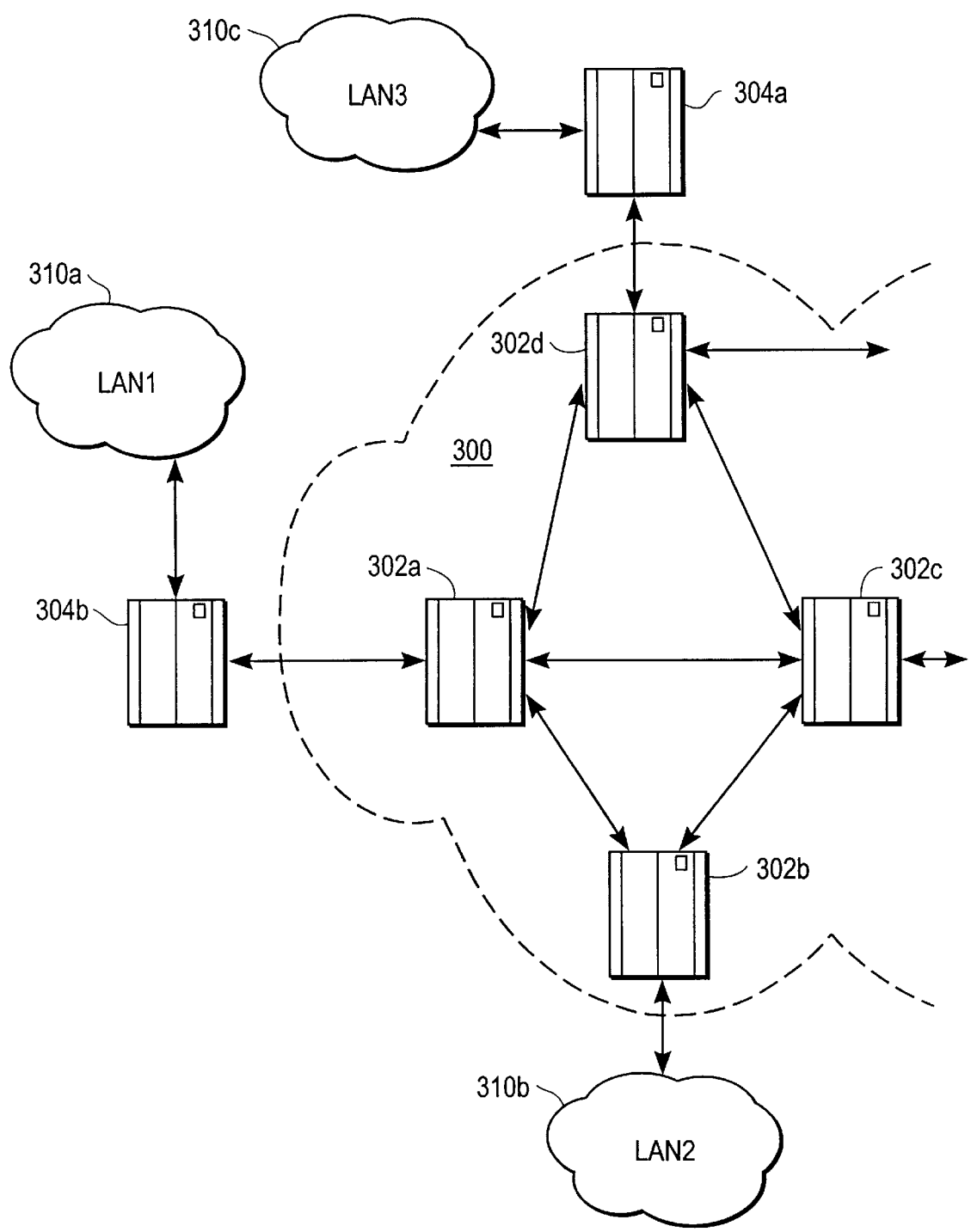
FIG. 8 is a diagram of a network according to one embodiment of the invention.

In one embodiment, the invention may be incorporated into a wide area network (WAN) or local area network (LAN) as shown in FIG. 8 to allow the identification of flows both within individual routing devices in the network and, in one embodiment, within the network or portions of the network. In one specific network-wide embodiment, once a router in the network determines a flow for a packet, the router may attach a flow identifier to that packet so that subsequent intermediate systems in the network need not redetermine the flow for the packet. In such a network, search engine 104 may be able to immediately determine if a flow has already been established for an incoming packet and may pass the packet immediately to processor 130. FIG. 8 shows the invention as embodied in a network with a WAN backbone 300 and LANS 310a–c. Each LAN 310 is connected to the WAN backbone by its local router 304. A flow identifier according to the invention would be employed in one or more of the routers shown and that router would identify flows and process packets as described herein. In the further embodiment as described above, once a router, such as 302a for example, had determined a flow for a packet, router 302a would include a flow identifier in the header of the packet transmitted out of 302a. The packet could then be processes by other routers in backbone 300 according to the flow without those routers having to look-up a flow for the packet.

The invention has now been explained in accordance with specific embodiments, however many variations will be obvious to those of skill in the art. In particular, the search memory and search data structure may be organized differently so long as a recursively retrieved FLOW_ID is combined with information from a packet to retrieve a next FLOW_ID. Also, the block diagram of FIG. 4 and the description group and organize functional blocks in a particular way to provide a clear example. However, other organizations are possible. The search memory search algorithm need not necessarily be a part of the engine used to extract a search key from a packet. In addition, multiple instances of elements, such as search engine 104, may be incorporated in an embodiment to allow for parallel processing of packets. These enumerated examples are not exhaustive of possible alternative embodiments of the invention. The invention should therefore not be limited except as provided in the attached claims.

What is claimed is:

1. A semiconductor integrated circuit device for use in a system in a network to distinguish data flows from one another comprising:

at least one input for receiving data units which make up flows;

at least one search memory for storing data structures corresponding to a plurality of flow identifications;

at least one search engine for performing searches at a rate greater than the arrival rate at said input of data, said search engine comprising a first dedicated hardware logic element having registers, said first logic element for storing searching parameters coupled to receive said data units, said first dedicated hardware logic element further for performing a substantially simultaneous recursive search on a plurality of fields of each of said data units according to flow identifications in said search memory to yield flow identifications of said data units; and at least one packet processing routing unit comprising a second dedicated hardware logic element having registers, said second dedicated hardware logic element for routing packets in accordance with flow definitions derived from said flow identifications provided by said data structures.

2. The device according to claim 1 wherein said search engine includes:

data extracting means to use parameters from said data structure to extract data from said data unit;

key determining means to logically combine said extracted data with a current flow identification to determine a key to search for a next flow identification data structure;

testing means to determine if a next flow identification data structure is found and then to test said next flow identification to determine if it is a terminal flow identification and if so, to set said flow identification as the packet flow identification for the packet and to end the recursion and to otherwise set said next flow identification as a current flow identification for a repeated recursion; and identification setting means for setting the current flow identification as the flow identification for the packet if a next flow identification data structure is not found and otherwise for ending the recursion.

3. The device according to claim 1 further comprising:

a search key generating engine for generating a search key from a packet comprising said data unit using parameters stored in said search memory or using default parameters; and a function for generating a multibit index from said search key, said index being used to retrieve the next data structure in a linked-list for said index such that n-ary searches are supported.

4. The device according to claim 3 wherein said function is a hashing function, said hashing function generating an hash index which points into said linked-list.

5. The device according to claim 1 wherein each of said dedicated hardware elements is implemented to perform in parallel operations with other like dedicated hardware elements.

* * * * *